United States Patent
Te Kolste

(12) 
(10) Patent No.: US 6,943,890 B2
(45) Date of Patent: Sep. 13, 2005

(54) COMPACT INTERFEROMETER AND USE IN WAVELENGTH MONITORING

(75) Inventor: Robert Te Kolste, Charlotte, NC (US)

(73) Assignee: Digital Optics Corporation, Charlotte, NC (US)

( * ) Notice: Subject to any disclaimer, the term of this patent is extended or adjusted under 35 U.S.C. 154(b) by 291 days.

(21) Appl. No.: 10/234,843

(22) Filed: Sep. 5, 2002

(65) Prior Publication Data

US 2003/0174336 A1 Sep. 18, 2003

Related U.S. Application Data

(60) Provisional application No. 60/364,107, filed on Mar. 15, 2002.

(51) Int. Cl.[7] ................................................. G01B 9/02
(52) U.S. Cl. ..................................................... 356/454
(58) Field of Search ................................. 356/454, 480, 356/519, 450, 451

(56) References Cited

U.S. PATENT DOCUMENTS

| | | | |
|---|---|---|---|
| 4,536,089 A | * | 8/1985 | Siebert ........................ 356/519 |
| 6,081,379 A | | 6/2000 | Austin |
| 6,125,220 A | | 9/2000 | Copner et al. |
| 6,186,937 B1 | | 2/2001 | Ackerman |
| 6,243,200 B1 | | 6/2001 | Zhou |
| 6,339,474 B2 | | 1/2002 | Paiam |
| 6,373,620 B1 | | 4/2002 | Wang |
| 2003/0107746 A1 | * | 6/2003 | Hedin et al. ................. 356/519 |

\* cited by examiner

*Primary Examiner*—Andrew H. Lee
(74) *Attorney, Agent, or Firm*—Susan S. Morse

(57) ABSTRACT

A compact interferometer includes a substrate having opposing faces and a suppression feature on one of the faces of the substrate. The suppression feature suppresses higher order reflections inside the substrate. The suppression feature may be an absorptive coating. The interferometer produces high throughput, high contrast signals when receiving light at normal or near normal incidence.

33 Claims, 6 Drawing Sheets

REFLECTANCE FROM Cr LAYER AS A FUNCTION OF THICKNESS, LIGHT COMING FROM AIR

REFLECTANCE OF Cr LAYER VS. THICKNESS, LIGHT COMING FROM FUSED SILICA SIDE

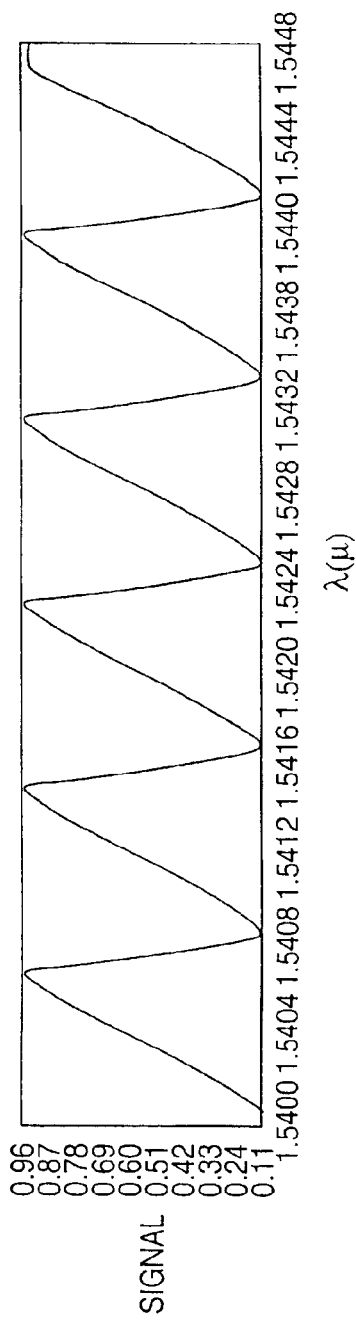
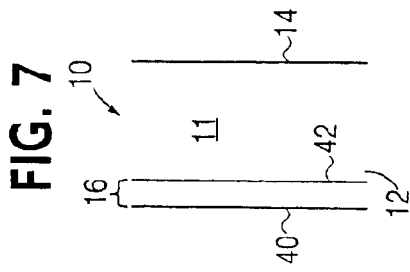

COMPACT INTERFEROMETER AND USE IN WAVELENGTH MONITORING

CROSS-REFERENCE TO RELATED APPLICATIONS

The present application claims priority under 35 U.S.C. §119 to commonly assigned, co-pending U.S. Provisional Application Ser. No. 60/364,107 filed Mar. 15, 2002 entitled "Partial Reflective Absorber for Normal Incidence Phase Shift Element" the entire contents of which are hereby incorporated by reference for all purposes.

BACKGROUND OF THE INVENTION

1. Field of the Invention

The present invention is directed to a compact interferometer allowing operation at normal incidence while outputting one or more periodic signals to be monitored, e.g., by a wavelength monitor. In particular, this invention is directed to suppressing higher order modes of interference while allowing the interferometer to be positioned at normal incidence.

2. Description of Related Art

The use of a shaped etalon to generate periodic signals is disclosed, for example, in commonly assigned, co-pending PCT Application Serial No. PCT/US01/21272 entitled "Integrated Wavelength Locker for use with more than one wavelength and Associated Methods" filed Jul. 6, 2001, the entire contents of which are hereby incorporated by reference for all purposes. The periodic signals are processed in accordance with phase shifting interferometry techniques to determine a wavelength of the light being monitored. Alternatively or additionally, a reference signal may be used in conjunction with one or more periodic signals to determine the wavelength.

In optimizing the sinusoidal nature of the periodic signals, suppression of higher order etalon modes is desired. This is typically achieved by providing the shaped etalon at an angle, e.g., 15 degrees. This tilt is greater than the amount of tilt incorporated to reduce back reflections from the etalon, which is typically on the order of a few degrees. However, mounting the etalon at a tilt can be difficult. Further, this tilt takes up space along the optical axis of the system, which is typically at a premium. Finally, the tilt reduces the contrast of the signals.

SUMMARY OF THE INVENTION

The present invention is therefore directed to an interferometer that outputs high contrast, resolvable periodic signals when mounted at any desired angle of incidence which substantially overcomes one or more of the problems due to the limitations and disadvantages of the related art.

It is an object of the present invention to provide an interferometer that outputs resolvable, high contrast, periodic signals, regardless of its angle relative to an input beam.

It is yet another object of the present invention to provide an interferometer that outputs resolvable, high contrast, periodic signals, when mounted at normal incidence relative to an input beam.

It is another object of the present invention to provide an interferometer that suppresses higher order modes of interference.

At least one of the above and other objects maybe realized by providing an interferometer including a substrate having first and second opposing surfaces, the substrate receiving an input beam at the first opposing surface and outputting at least one beam resulting from interference between at least two beams, a first beam of the at least two beams being reflected at least once inside the substrate and a second beam of at least two beams being output without reflection inside the substrate, and a non-reciprocal element on the first opposing surface, the non-reciprocal element interacting differently with the input beam than with light traveling in the substrate.

The non-reciprocal element may be a coating that presents a first reflectivity to light incident from the substrate and a second reflectivity to an input beam, the first and second reflectivities being different. The first reflectivity may be less than the second reflectivity for wavelengths at which the interferometer is to be used. The difference between the first and second reflectivities suppress higher order interference signals created between light from the first and second surfaces. The non-reciprocal element may be an absorptive coating, e.g. a metal or a metal oxide coating, more particularly, chromium. The chromium has a thickness between 20 and 80 Angstroms.

The interferometer of may include a shaped structure introducing at least two regions having different optical path lengths. The shaped structure may include steps of different heights in respective regions. The steps may form a two-dimensional array, e.g., a square. The regions may form a two-dimensional array. The regions may be lithographically created.

The non-reciprocal element may include an intermediate layer between the coating and substrate, the intermediate layer having a different refractive index than both the coating and the substrate. The intermediate layer may have a refractive index greater than that of both the coating and the substrate.

At least one of the above and other objects of the present invention may be realized by providing a wavelength monitor that monitors an input light beam, the wavelength monitor including a beam splitter, a detector, and an interferometer. The interferometer includes a substrate having first and second opposing surfaces, a non-reciprocal element on one of the first and second opposing surface, the non-reciprocal element interacting differently with an input beam to the interferometer and with light traveling in the substrate, and a reflective coating on a surface opposite the non-reciprocal element, wherein the beam splitter directs a portion of the input light beam onto the interferometer and the detector receives light output from the interferometer, the interferometer producing a high contrast, high throughput periodic signal at the detector.

The wavelength monitor may include a shaped structure introducing at least two regions, the at least two regions having different optical path lengths from one another, the shaped structure being on one of the first and second opposing surfaces. The at least two regions of the shaped structure may correspond to active regions of the detector. The non-reciprocal element may be on the first and second opposing face closest to the detector. The beam splitter may be between the interferometer and the detector. Light may be incident on the interferometer at a substantially normal angle. The wavelength monitor may include a processor receiving signals output from the detector and determining a wavelength of the input light. The at least two regions of the shaped structure may form a two-dimensional array.

At least one of the above and other objects of the present invention may be realized by providing an interferometer having a first surface transmitting part of an input beam to create a first beam and reflecting part of the input beam to create a second beam at an output plane, a second surface, opposite the first surface, reflecting the first beam back to the first surface, the first surface transmitting part of the first beam reflected from the second surface, and a suppression feature which suppresses higher order reflections of the first beam from the second surface, the first and second beams interfering and producing a high contrast, high throughput periodic signal at the output plane.

The suppression feature may be a coating on the first surface that presents a first reflectivity to the input beam and a second reflectivity to the first beam reflected from the second surface and/or a grating. The grating may be on the first surface, only a portion of the second surface is reflective, and non-zero orders output by the grating miss the reflective portion on the second surface. The suppression feature may a partially absorptive coating or a grating with a partially absorptive coating thereon. The suppression feature may be a partially absorptive coating and another layer under the partially absorptive coating, the another layer having a higher refractive index than the partially absorptive coating. The input beam may be incident on the interferometer at a substantially normal angle. The suppression feature may suppress more than one reflection of the first beam from the second surface.

At least one of the above and other objects of the present invention may be realized by providing an interferometer including a substrate having first and second surfaces, the substrate outputting a first beam and a second beam to an output plane, the first beam being output without reflection inside the substrate and the second beam being reflected at least once through the substrate, and a suppression feature on one of the first and second surfaces, the suppression feature suppressing higher order reflections inside the substrate, the first and second beams interfering and producing a high contrast, high throughput periodic signal at the output plane.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 7 is a detailed schematic side view of an alternative layer structure for the interferometer;

FIG. 8A is a plot of an output of the structure of FIG. 7;

DETAILED DESCRIPTION

Figure 1:
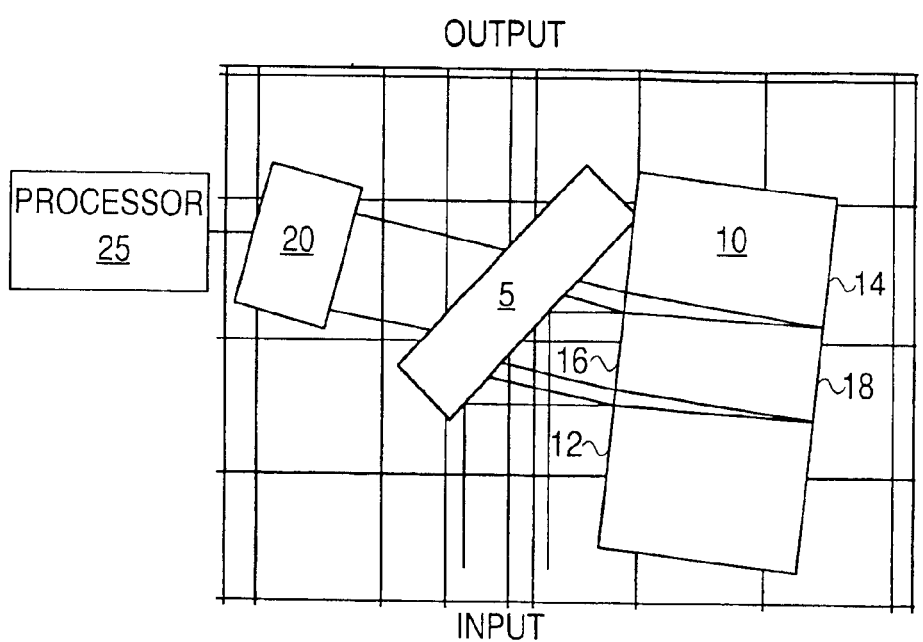
FIG. 1 is a schematic top view of a general configuration of using interferometer of the present invention.

The present invention will be described in detail through embodiments with reference to accompanying drawings. However, the present invention is not limited to the following embodiments but may be implemented in various types. The embodiments are only provided to make the disclosure of the invention complete and make one having an ordinary skill in the art know the scope of the invention. The thicknesses of various layers and regions are emphasized for clarity in accompanying drawings. Also, when a layer is defined to exist on another layer or a substrate, the layer may exist directly on another layer or substrate, or an interlayer layer may be present therebetween. Throughout the drawings, the same reference numerals denote the same elements FIG. 1 illustrates an interferometer 10 in accordance with the present invention used in a wavelength monitor. The wavelength monitor includes a conventional beam splitter 5, the interferometer 10 and a detector 20. The interferometer 10 includes a substrate 11 having a front surface 12 and a back surface 14. The interferometer 10 may also include a shaped structure 18 on one of the front and back surfaces to introduce a relative phase shift between portions of the beam. Here, the shaped structure 18 is a reflective structure on the back surface 14 of the interferometer 10. The shaped structure 18 may include at least two regions that introduce different phase shifts to the beam relative to one another, i.e., different optical path lengths. If the shaped structure 18 is not included, the back surface 14 may simply have a reflective coating thereon. If the wavelength monitor is to be used for a back facet, more of the light may be directed by the splitter 5 onto the interferometer 10 and a collimating lens may be included in the monitor to capture more of the light.

The beam splitter 5 taps off part of the input beam and directs it onto the interferometer 10. Part of the light incident on the front surface 12 is directed back to the beam splitter 5, and is transmitted onto the detector 20. Light incident on the back surface 14 at the shaped structure 18 is reflected back to the front surface 12, through the beam splitter 5, also onto the detector 20. At the detector 20, the beams from the front surface 12 and the back surface 14 overlap and interfere to create periodic signals to be used to determine the wavelength of the input light. A processor 25, which may be remote from or part of the wavelength monitor, receives the periodic signals output from the detector 20 and determines the wavelength of the light.

If the shaped structure 18 is used, there will be a plurality of periodic signals offset relative to one another. The number of offset signals will depend on the number of different phase regions present by the shaped structure 18. When at least two periodic signals are simultaneously output from the interferometer 10, the processor 25 may determine the wavelength of the light using, for example, phase shifting interferometry techniques. When a single periodic signal is output, a reference signal is used in conjunction with the periodic signal to determine the wavelength. Of course, the reference signal could also be used with the at least two periodic signals as well. Since the interference pattern arises from the overlap of the signals reflected from the front surface 12 and the back surface 14, a region of the detector that only receives light from the front surface 12 may serve to generate the reference signal.

The interferometer 10 is shown in FIG. 1 at an angle of 5 degrees for reducing back reflections. If an isolator or other feedback reducing mechanism is included in the system, the interferometer 10 may be oriented at normal incidence. Of course, the interferometer 10 may be mounted at any desired angle, as long as there is sufficient overlap at the detector plane to generate the needed interference signals. The best signal efficiency is normally realized when the overlap is maximized, typically at normal incidence.

Figure 1A:
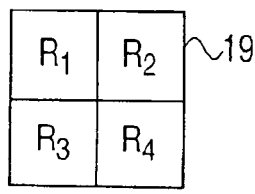
FIG. 1A is a schematic side view of an embodiment of an interferometer to be used in FIG. 1.

The shaped structure 18 may be designed in accordance with the regions of the detector 20. For example, as shown in FIG. 1A, the shaped structure 18 of the interferometer 10 on the back surface 14 may be a stepped mirror 19. As shown in detail in FIG. 1A, the stepped mirror 19 may include four regions $R_1$–$R_4$. Each of these regions will present a different phase shift relative to the other regions to the beam incident on that region. In the particular example shown, this may be realized by providing different heights for each step in a region. Such a configuration for the shaped structure is advantageous when the detector 20 is a quadrature detector. The stepped mirror 19 would then have variations in height such that the regions $R_1$–$R_4$ of the stepped mirror 19 would have a corresponding region on the quadrature detector. Other manners of introducing phase shifts, other arrangements of the different phase shift regions, and other detector configurations may be used. Other numbers of phase shift regions may be used. The phase shift regions may be created lithographically and only need to present a small relative phase shift, e.g., a fraction of a wavelength, therebetween for wavelengths to be resolved.

Typically when reflective surfaces are positioned facing one another, an etalon is formed. The output of a conventional etalon is due to multiple-beam interference from the multiple reflections at both surfaces. Multiple-beam interference results in a redistribution of the energy density compared to that of a sinusoidal two-beam interference pattern. The output of the etalon is periodic and the exact shape depends on the finesse of the etalon. Conventionally, both surfaces of an etalon are provided with the same reflectance. The higher the reflectance of the surface, the higher the finesse of the etalon. An etalon having a high finesse outputs a signal with a high contrast. However, the signal output from a high finesse etalon also includes flattened portions, leaving unresolvable regions over which a change in the parameter being measured will not correspond to a change in the output signal. As the finesse is lowered, contrast decreases. So the design of a conventional etalon involves trade-offs between high contrast, i.e., large changes in intensity values, and a useful locking range, both of which are useful in determining the value of the parameter of interest.

Figure 2:
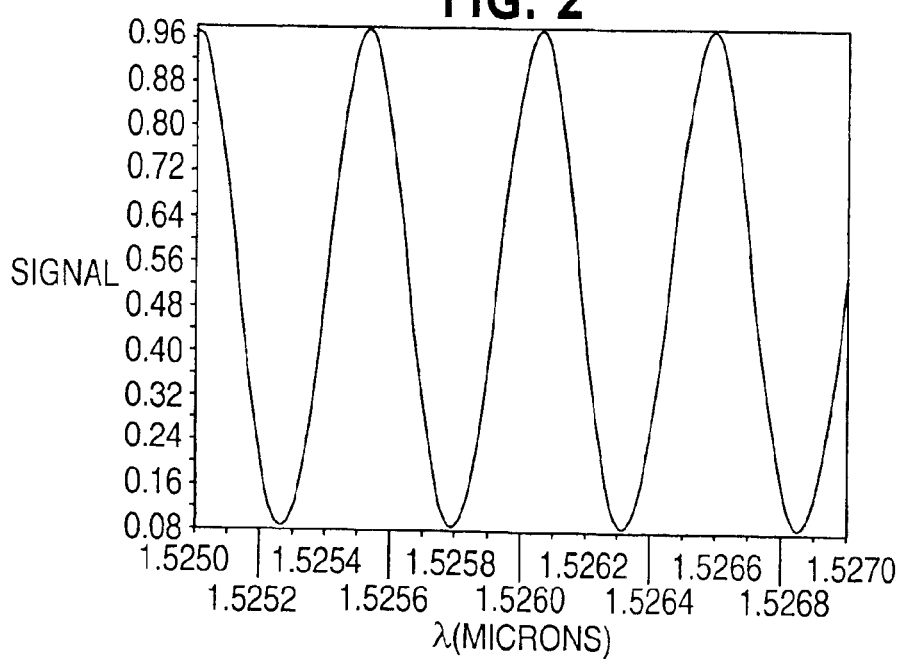
FIG. 2 is a plot of the light output from the one region of the interferometer receiving the light at normal incidence.

By eliminating higher order reflections, e.g., other than the first reflection from each surface or the "zero-order" reflection, a sinusoidal signal with high contrast can be produced, as shown in FIG. 2. The more effectively the higher order reflections can be suppressed, the more the output will be the product of two beam interference. Thus, the interferometer of the present invention is no longer functioning as an etalon, but as a two-beam interferometer. The output shown in FIG. 2 has the desired characteristics of a high throughput, e.g., greater than 50%, more particularly, greater than 70%, and high contrast, e.g., greater than 3. As used herein, throughput is the ratio of the peal power to the input power and contrast is the ratio of the peak to valley powers.

If the shaped structure 18 is used, the signal in FIG. 2 is only the signal for one of regions. For the particular example shown in FIGS. 1A, four such signals, shifted relative to one another, would be output. These output signals may then be sent to the processor 25 to determine the wavelength of the light using, for example, phase shifting interferometry techniques, as set forth, for example, in the above mentioned PCT Application Serial No. PCT/US01/21272.

In accordance with the present invention, suppression of higher order reflections is achieved by providing a non-reciprocal element 16 on one surface of interferometer 10. A reflective coating, e.g., a pure reflector, may be provided on the other surface of the interferometer. As used herein, the term "non-reciprocal" element is to mean an element that interacts with light differently depending upon the media the light is traveling in when it is incident on the element. The non-reciprocal portion reflects some of the light to create one of the two beams needed for interference. The reflective surface reflects the light to create the other of the two beams needed. This reflected light is then incident on the non-reciprocal element. However, as little as possible of the light is reflected, so only the two beams interfere, forming the high contrast sinusoidal output shown in FIG. 2.

Figure 3:
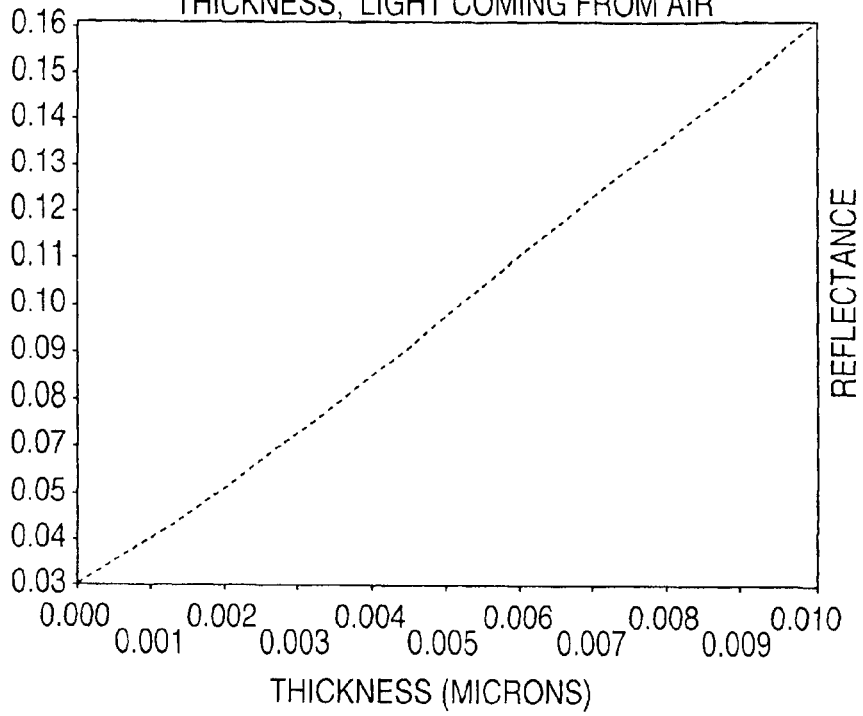
FIG. 3 is a plot of the reflectance at the air-layer interface for the interferometer.
Figure 4:
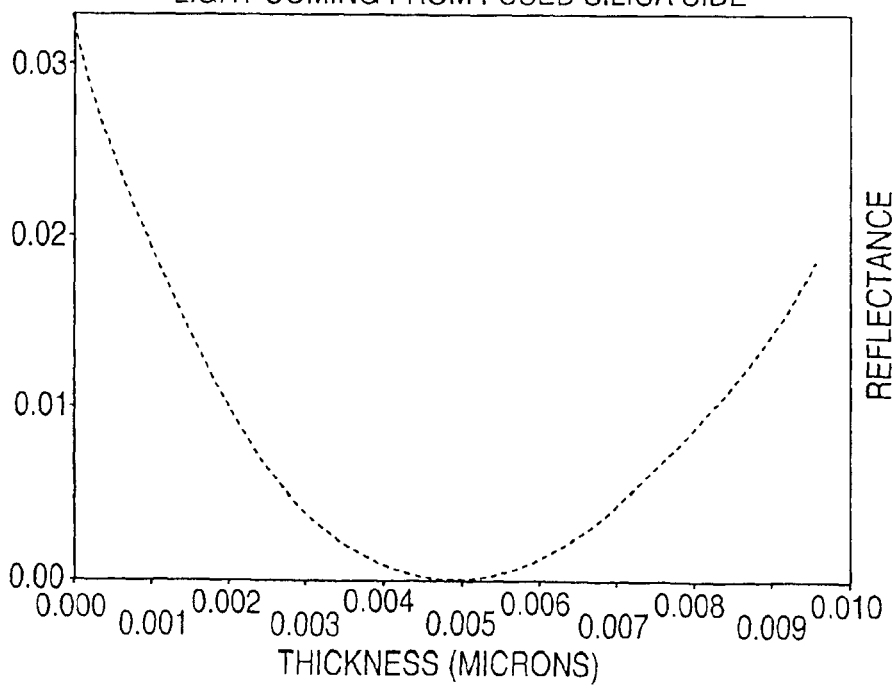
FIG. 4 is a plot of the reflectance at the substrate-layer interface for the interferometer.

As shown in FIG. 1, the non-reciprocal element 16 is on the front surface 12 and a reflective coating is on the back surface 14, with or without the shaped structure 18 thereon. The coating on the back surface 14 may be highly reflective, e.g., aluminum. The non-reciprocal element 16 may be any material having some absorption in the wavelength region of interest. For example, for a wavelength of 1.5 microns, a metal or a metal oxide coating may be used. As a particular example, when the substrate of the interferometer is fused silica, a chromium (Cr) coating having a thickness of 50 Angstroms may be used on the front surface 12 to realize this suppression. As can be seen in FIG. 3, light incident from air on this Cr coating is partially reflected. However, as shown in FIG. 4, light incident from the fused silica on this Cr coating is not reflected. The wavelength of the light used to create the plots in FIGS. 3 and 4 is 1.5 microns.

The ability to use coatings to suppress the etalon behavior while still creating sinusoidal signals from interference at the detector arises from the differences in refractive index boundary conditions, resulting in non-reciprocal behavior of the partially absorptive coating. In other words, the light incident at the air-element interface reflects part of that light towards the detector to form one of the beams needed for interference. Some of light incident at the substrate-element interface is transmitted to the detector, creating another beam. However, the remainder of the light is absorbed in the layer 16 rather than reflected, so only the two beams interfere, forming the high contrast sinusoidal output shown in FIG. 2.

The exact thickness required to achieve sufficient non-reciprocal behavior to output a high contrast, periodic signal will depend on the type of coating used, the material of the substrate and the wavelengths of interest. Variation in the thickness of the coating, and thus the reflectance, may result in overall loss of signal modulation. As long as this variation does not degrade the signal-to-noise ratio too badly, it can be compensated for by adjusting gain and offset. Since these features can be characterized and backed out, this adjustment may be performed in the digital domain using software.

Figure 5:
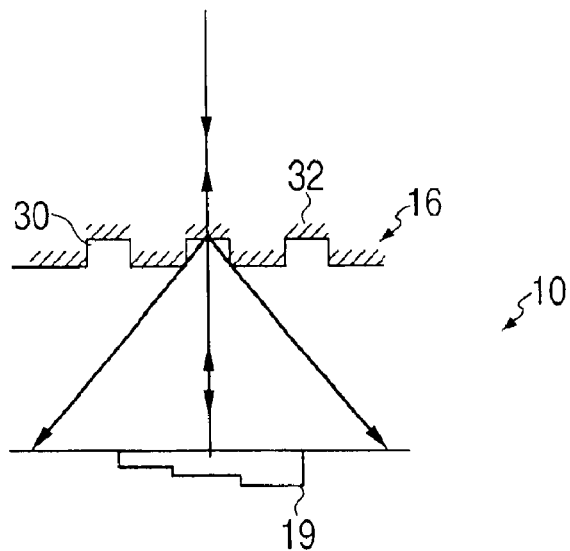
FIG. 5 is a schematic side view of a grating on the interferometer.

Alternatively or additionally, an anti-reflection grating 30 may be used as the non-reciprocal element 16 as shown in FIG. 5. The grating may have a period $\Lambda$ between approximately $\lambda/n$ and approximately $2\lambda$ and may have an etch depth of less than $\lambda$, e.g., $\lambda/4n$, where $\lambda$ is the design wavelength and n is the wavelength of the material in which the grating is formed. The grating may be etched into the substrate 11 itself or may be provided in another material, e.g., $TiO_2$ or silicon, on top of the substrate 11. As shown in FIG. 5, the grating 30 may include a coating 32 thereon. The grating suppresses the zero order reflections to reduce the etalon effect. Higher order beams may be diffracted such that they avoid the shaped structure 19, if used, and/or a reflective coating on the back surface 14, further reducing the etalon effect. The grating may be designed to operate at a preferred light polarization of light output from the source.

Using a grating may help extend the wavelength range of the interferometer. The use of the grating to null out reflections may allow more variation of the coating from the optimum thickness. This zero order reflection suppression can be made virtually constant across the C band for an appropriate choice of etch depth, in a known manner.

Figure 6:
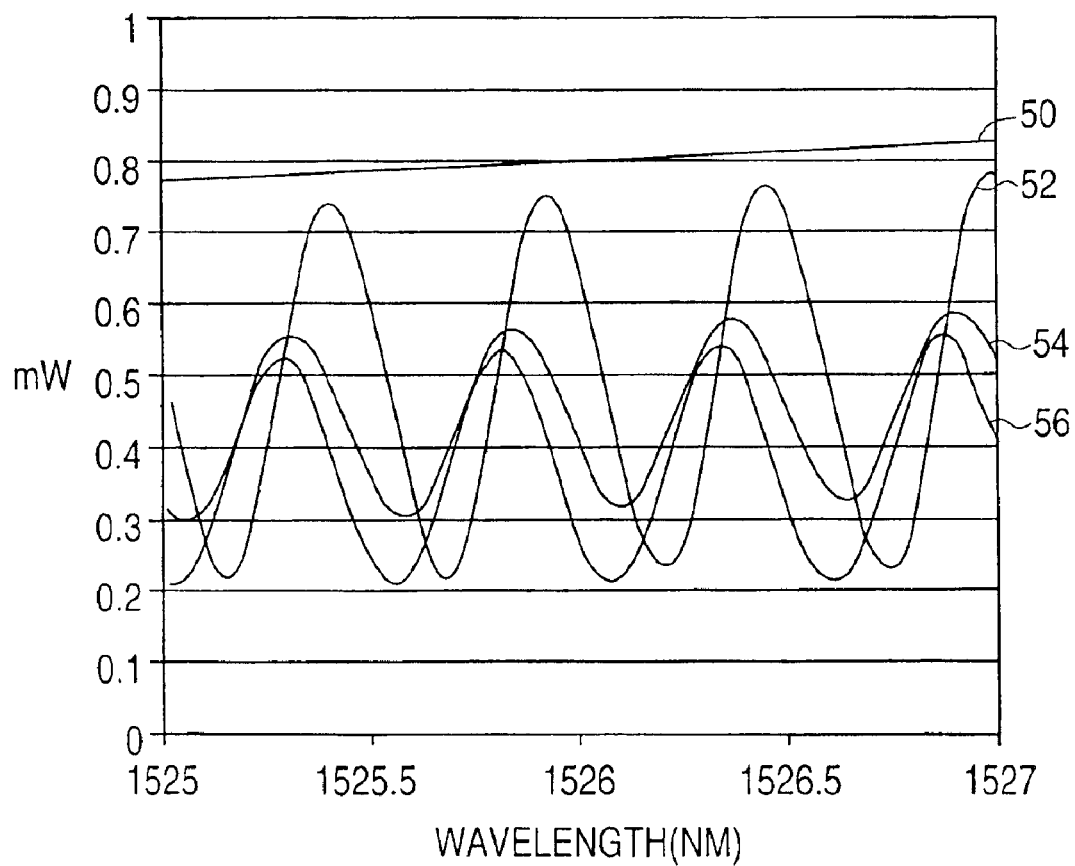
FIG. 6 is a plot comparing outputs of different configurations of the interferometer.

A wavelength scan comparing these different solutions used at normal incidence on a fused silica substrate is shown in FIG. 6. Plot 50 is the bare aluminum on the front with Cr on the back surface. Plot 52 is the Cr coating, plot 54 is the Cr coating on the grating, and plot 56 is the grating, each coating being on the front surface with Al on the back surface. As can be seen therein, each configuration using a non-reciprocal element offers dramatic signal enhancement over bare aluminum.

Another configuration of the non-reciprocal element 16 of the present invention includes an absorptive layer 40 and an intermediate layer 42. The intermediate layer 42 is between the absorptive layer 40 and the front surface 12 of the substrate 11. The back surface 14 of the interferometer 10 has a high reflectance coating, either with or without the shaped structure 18. The absorptive layer 40 reflects some of the light back towards the beam splitter, as shown in FIG. 1. The intermediate layer 42 has a refractive index that is different enough from that of the substrate 11 such that some light incident on the intermediate layer 40 from the substrate 10 is reflected back into the substrate 10.

This in essence forms a Gires-Tournois (G-T) etalon in the substrate 10. A G-T etalon outputs constant intensity and varying phase signals. This is different from a conventional Fabry-Perot etalon, which modulates both intensity and phase. The free spectral range of the G-T etalon is determined by the thickness of the substrate. The back reflections from the intermediate layer 42 may reflect a significant, but minor, portion, e.g., 10–20%, of the light incident thereon from the substrate 10. The higher the reflectance of the intermediate layer 42, the higher the finesse of the etalon. The remainder of the light is incident on the absorptive layer 40.

The thickness of the absorptive layer 40 is tuned to act as an anti-reflective coating for the light coming from the intermediate layer 42. The combined thickness of the absorptive layer 40 and the intermediate layer 42 provide an arbitrary phase offset. These arbitrary phase offsets can be used, in combination with the reflectance of the layer 42-substrate interface, to generate numerous types of useful outputs of intensity versus wavelength that are different from those output by conventional etalons.

As an example, the substrate 11 may be fused silica, the absorptive layer 40 may be chromium and the intermediate layer 42 may be silicon. The layer of silicon may be 1650 Angstroms and the layer of chromium may be 250 Angstroms. The multiple, but low order, reflections create in such a structure do not produce a typical etalon signal, but create a saw tooth signal, as shown in FIG. 8A. The saw tooth signal provides a larger locking range than that of a sinusoidal signal, even when the resets are at the same frequency. As in the previous embodiments, a shaped structure may be incorporated in the interferometer 10 to provide a plurality of periodic signals and/or a reference signal may be provided to determine the wavelength.

Figure 8B:
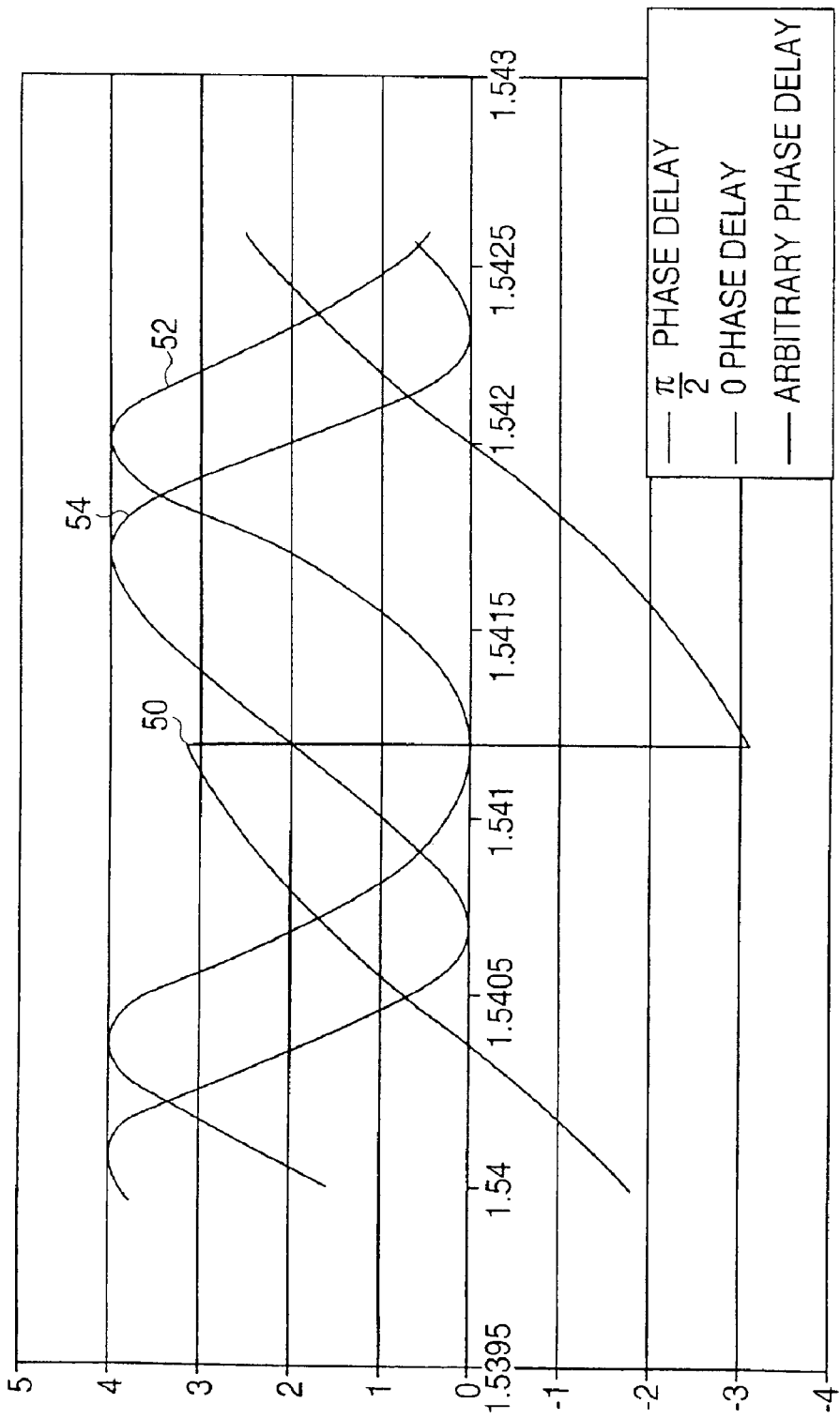
FIG. 8B are various plots of outputs of the structure of FIG. 7 having different phase delays introduced.

The effect of altering the phase offset presented by the combined layers 40, 42 on the output of the interferometer 10 of FIG. 7 is shown in FIG. 8B. Setting the thickness of these layers to provide a $\pi/2$ phase delay produces a saw-tooth output 50. If no phase delay is provided, a more typical etalon-like output 52 is produced. When the phase delay is somewhere between these two values, an output 54 which is starting to approximate a saw tooth is produced.

Figure 9B:
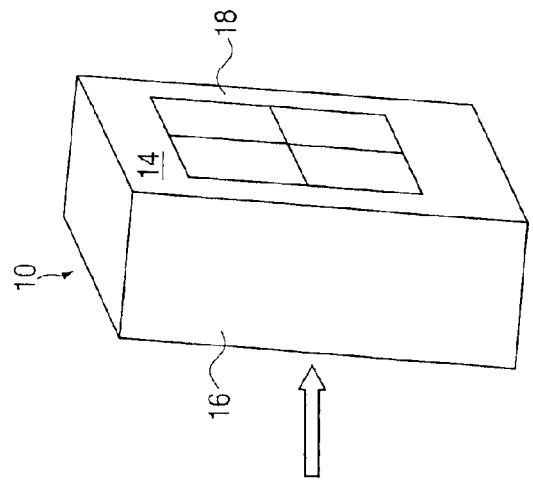
FIG. 9B is a detailed schematic perspective view of the interferometer of FIG. 9A.
Figure 9A:
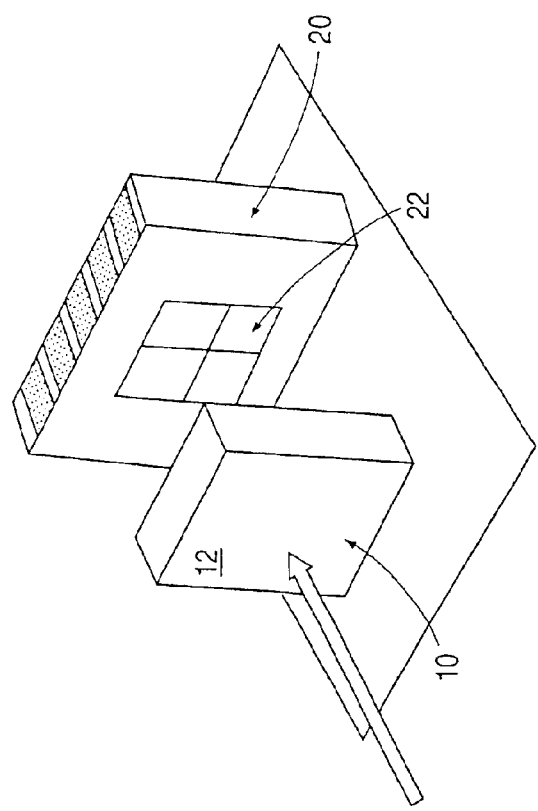
FIG. 9A is schematic perspective view of using an interferometer of the present invention in a transmissive configuration.
Figure 10:
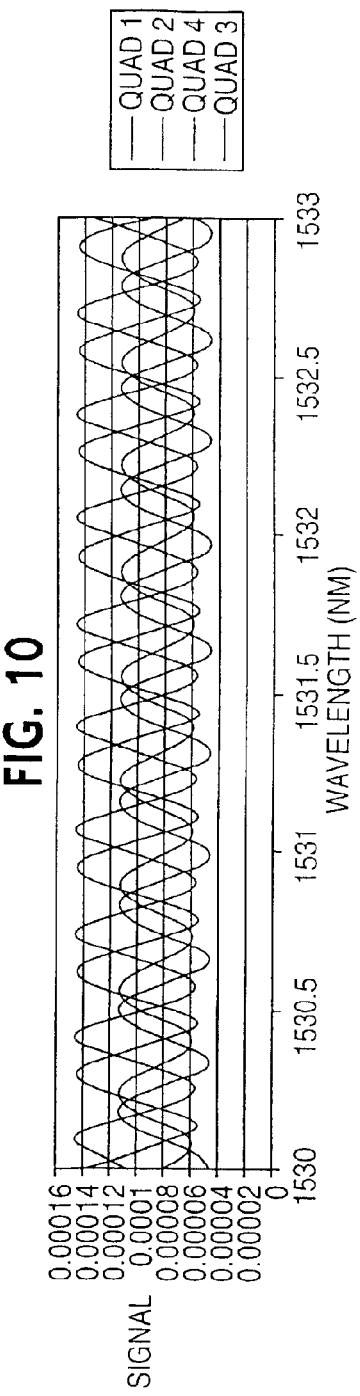
FIG. 10 is a plot of an output of the different regions of the interferometer in FIGS. 9A–9B.

Another embodiment of the wavelength monitor using the interferometer in accordance with the present invention is shown in FIGS. 9A and 9B. Here, light incident on the interferometer 10 is transmitted there through to the detector 20, here shown as a quadrature detector with four detecting regions 22. The light is still incident on the non-reciprocal element 16. In this embodiment, the back surface 14 reflects less than half of the light. This reflectance may be just due to the interface between the substrate 11 and the environment. The non-reciprocal layer 16 is detuned from a thickness at which it suppresses all reflections of light incident from the substrate 11, or else there would be no second beam at the detector plane to interfere with the first beam. Thus, a very low finesse etalon is formed and higher order reflections, e.g., more than a few reflections, are suppressed. The detuning may involve either an increase or decrease in thickness, as can be seen from FIG. 4. For example, the non-reciprocal element may be a 350-Angstrom thick chrome layer. This detuning results in a less sinusoidal signal. Since there is no beam splitter used in this configuration, the alignment between the interferometer and the detector is simpler and complete overlap between the beams at the detector plane may be realized. A shaped structure 18 may be etched into the back surface 14 of the interferometer 10, preferably matched to the detecting regions 22. A plot of the output of the interferometer 10 used in transmissive mode is shown in FIG. 10.

Thus, in accordance with the present invention, a non-reciprocal element may be used on an interferometer at normal incidence or near normal incidence to suppress higher order reflections, while providing a periodic, high contrast, efficient signal at the detector. For embodiments using only zero order reflections, whose angle is not wavelength dependent, the wavelength dependence of the interferometer should also be good. Further, since the intermediate layer does not need to be very thick, the wavelength dependence is still good. A shaped structure may be used in the interferometer to provide a plurality of periodic signals and/or a reference signal may be provided to determine the wavelength. The plurality of signals, depending on the particular configuration of the shaped structure and the detector, may then be processed using phase shifting interferometric techniques to provide wavelength monitoring over a continuous wavelength range. Alternatively, the best signal for the wavelength being monitored may be selected from the plurality of available periodic signals and used with the reference signal to determine the wavelength. The interferometer of the present invention is also simpler to make than conventional etalons.

While the present invention is described herein with reference to illustrative embodiments for particular applications, it should be understood that the present invention is not limited thereto. For example, a linear arrangement or a circular arrangement of the phase shift regions may be used. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. An interferometer comprising:

a substrate having first and second opposing surfaces, the substrate receiving an input beam at the first opposing surface and outputting at least one beam resulting from interference between at least two beams, a first beam of the at least two beams being reflected at least once inside the substrate and a second beam of at least two beams being output without reflection inside the substrate; and a non-reciprocal element on the first opposing surface, said non-reciprocal element interacting differently with the input beam than with light traveling in the substrate.

2. The interferometer of claim 1, wherein the non-reciprocal element is a coating that presents a first reflectivity to light incident from the substrate and a second reflectivity to an input beam, the first and second reflectivities being different.

3. The interferometer of claim 2, wherein the first reflectivity is less than the second reflectivity for wavelengths at which the interferometer is to be used.

4. The interferometer of claim 2, wherein a difference between the first and second reflectivities suppress higher order interference signals created between light from the first and second surfaces.

5. The interferometer of claim 1, wherein the non-reciprocal element is a metal or a metal oxide coating.

6. The interferometer of claim 5, wherein the coating is chromium.

7. The interferometer of claim 6, wherein the chromium has a thickness between 20 and 80 Angstroms.

8. The interferometer of claim 1, further comprising a shaped structure introducing at least two regions having different optical path lengths.

9. The interferometer of claim 8, wherein the shaped structure includes steps of different heights in respective regions.

10. The interferometer of claim 9, wherein the steps form a two-dimensional array.

11. The interferometer of claim 10, wherein the two-dimensional array is a square.

12. The interferometer of claim 8, wherein the regions form a two-dimensional array.

13. The interferometer of claim 8, wherein the regions are lithographically created.

14. The interferometer of claim 2, wherein the non-reciprocal element further includes an intermediate layer between the coating and substrate, the intermediate layer having a different refractive index than both the coating and the substrate.

15. The interferometer of claim 14, wherein the intermediate layer has a refractive index greater than that of both the coating and the substrate.

16. A wavelength monitor that monitors an input light beam, the wavelength monitor comprising:
a beam splitter;
a detector; and
an interferometer, the interferometer including
a substrate having first and second opposing surfaces;
a non-reciprocal element on one of the first and second opposing surface, said non-reciprocal element interacting differently with an input beam to the interferometer and with light traveling in the substrate s; and
a reflective coating on a surface opposite the non-reciprocal element;
wherein the beam splitter directs a portion of the input light beam onto the interferometer and the detector receives light output from the interferometer.

17. The wavelength monitor of claim 16, further comprising a shaped structure introducing at least two regions, said at least two regions having different optical path lengths from one another, the shaped structure being on one of the first and second opposing surfaces.

18. The wavelength monitor of claim 17, wherein said at least two regions of the shaped structure correspond to active regions of the detector.

19. The wavelength monitor of claim 16, wherein the non-reciprocal element is on the first and second opposing face that is closest to the detector.

20. The wavelength monitor of claim 16, wherein the beam splitter is between the interferometer and the detector.

21. The wavelength monitor of claim 16, wherein light is incident on the interferometer at a substantially normal angle.

22. The wavelength monitor of claim 16, further comprising a processor receiving signals output from the detector and determining a wavelength of the input light.

23. The wavelength monitor of claim 17, wherein the at least two regions of the shaped structure form a two-dimensional array.

24. An interferometer receiving an input beam, the interferometer comprising:
a first surface transmitting part of the input beam to create a first beam and reflecting part of the input beam to create a second beam at an output plane;
a second surface, opposite the first surface, reflecting the first beam back to the first surface, the first surface transmitting part of the first beam reflected from the second surface; and
a suppression feature which suppresses higher order reflections of the first beam from the second surface, the first and second beams interfering and producing a high contrast, high throughput periodic signal at the output plane.

25. The interferometer of claim 24, wherein the suppression feature is a coating on the first surface that presents a first reflectivity to the input beam and a second reflectivity to the first beam reflected from the second surface.

26. The interferometer of claim 24, wherein the suppression feature is a grating.

27. The interferometer of claim 26, wherein the grating is on the first surface, only a portion of the second surface is reflective, and non-zero orders output by the grating miss the reflective portion on the second surface.

28. The interferometer of claim 24, wherein the suppression feature is a partially absorptive coating.

29. The interferometer of claim 24, wherein the suppression feature is a grating with a partially absorptive coating thereon.

30. The interferometer of claim 24, wherein the suppression feature is a partially absorptive coating and another layer under the partially absorptive coating, the layer having a higher refractive index than the partially absorptive coating.

31. The interferometer of claim 24, wherein the input beam is incident on the interferometer at a substantially normal angle.

32. The interferometer of claim 24, wherein the suppression feature suppresses more than one reflection of the first beam from the second surface.

33. An interferometer receiving an input beam, the interferometer comprising:
a substrate having first and second surfaces, the substrate outputting a first beam and a second beam to an output plane, the first beam being output without reflection inside the substrate and the second beam being reflected at least once through the substrate; and
a suppression feature on one of the first and second surfaces, the suppression feature suppressing higher order reflections inside the substrate, the first and second beams interfering and producing a high contrast, high throughput periodic signal at the output plane.

* * * * *